(12) United States Patent
Rice

(10) Patent No.: US 7,122,136 B2
(45) Date of Patent: Oct. 17, 2006

(54) GLARE PREVENTION FEATURE

(75) Inventor: Lawrence M. Rice, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 140 days.

(21) Appl. No.: 10/633,900

(22) Filed: Aug. 4, 2003

(65) Prior Publication Data

US 2005/0030757 A1    Feb. 10, 2005

(51) Int. Cl.
  *B29D 11/00* (2006.01)
(52) U.S. Cl. ............... 264/1.9; 264/2.5; 264/328.1
(58) Field of Classification Search .......... 264/1.1, 264/1.7, 1.9, 2.5, 328.1; 362/509; 359/642
  See application file for complete search history.

(56) References Cited

U.S. PATENT DOCUMENTS

| 4,336,578 | A | | 6/1982 | Bradley et al. |
| 4,563,730 | A | | 1/1986 | Saito |
| 4,703,401 | A | | 10/1987 | Ichihara et al. |
| 4,885,668 | A | | 12/1989 | Maglica et al. |
| 5,130,904 | A | | 7/1992 | Ohshio et al. |
| 5,546,285 | A | * | 8/1996 | Takikawa et al. ........... 362/509 |
| 5,642,228 | A | * | 6/1997 | Takezawa et al. .......... 359/642 |
| 6,152,589 | A | | 11/2000 | Kawaguchi et al. |
| 6,165,407 | A | * | 12/2000 | Tahara et al. ............. 264/328.1 |
| 6,454,433 | B1 | | 9/2002 | Alessio |
| 6,551,540 | B1 | * | 4/2003 | Porter ......................... 264/255 |
| 2002/0001200 | A1 | | 1/2002 | Matsubara |
| 2002/0057579 | A1 | | 5/2002 | Ohkodo et al. |
| 2002/0145882 | A1 | | 10/2002 | Shimakura |

FOREIGN PATENT DOCUMENTS

| CS | 9201096 | * | 11/1993 |
| JP | 58-217331 | * | 12/1983 |
| JP | 09190705 A | | 7/1997 |

* cited by examiner

*Primary Examiner*—Mathieu D. Vargot
(74) *Attorney, Agent, or Firm*—Ice Miller LLP

(57) ABSTRACT

The subject invention relates to a method of molding an automotive front lamp assembly that prevents the formation of a sink on the reflector by cutting an area into an injection molding tool so that when the reflector is molded, a glare prevention feature is formed in approximately the same location as the sink would have been formed.

6 Claims, 11 Drawing Sheets

GLARE PREVENTION FEATURE

BACKGROUND OF THE INVENTION

Automotive forward lamp assemblies have been modified over the years to decrease the overall mass of the assemblies in order to increase the safety and the gas mileage of automobiles. Most conventional automotive forward lamp assemblies require a large amount of mass concentration at the front of the vehicle. For example, a typical headlamp and fog lamp assembly will comprise a housing with a reflector, at least one filament bulb, a plurality of electrical wires and a lens. This construction results in a large mass concentration located at the front of the vehicle. In the event of a vehicular accident, a large mass concentration at the front of the vehicle is undesirable because it can result in increased damage and increased injuries. This is especially problematic in the event an automobile collides with a pedestrian.

In an effort to reduce the mass of automotive front lighting systems, designers have begun using thermoplastic materials to construct the reflector for headlamp and fog lamp assemblies. Thermoplastic reflectors have the advantage of having less mass than other types of reflectors. Thus, thermoplastic reflectors reduce the overall weight of the lamp assembly. Unfortunately, thermoplastic materials have the drawback of creating manufacturing defects in the form of sinks. As used herein, the term "sink" is used to describe a manufacturing defect located on the reflector that forms a pit in the reflector (i.e. an indentation, a recess and/or a concave surface). A sink causes a large amount of glare to be emitted from the lamp assembly because the defect reflects light in such a manner that a large amount of light is concentrated over a small angle when light reflects from the sink. Concentration of light over a small angle can result in unwanted glare or bright spots in the beam pattern. Thus, sinks are detrimental to the optical performance of an automotive lamp assembly because they cause the lamp assembly to emit a large amount of glare. Sinks occur frequently in the manufacturing of headlamp reflectors because of the thick sections required to form the reflector. For example, a sink normally forms around the socket hole of the reflector. While this is an example of a normal location of a sink, sinks of all shapes and sizes are also prone to appear in other portions of the reflector. In order to use thermoplastic reflectors to manufacture headlamp assemblies, designers of headlamp assemblies are faced with overcoming the glare problems associated with sinks.

Accordingly, it is desirable to have an automotive forward lamp assembly that would allow for the use of a thermoplastic reflector without having the large amount of glare resulting from a sink in the thermoplastic reflector. Specifically, it is desirable to develop a design feature that can eliminate the optical problems caused by sinks on thermoplastic reflectors.

BRIEF SUMMARY OF THE INVENTION

In order to prevent a sink from forming on a reflector, one exemplary embodiment of the subject invention comprises a automotive front lamp assembly with a reflector that has at least one glare prevention feature where normally a sink would form. The glare prevention feature of this embodiment comprises a convex reflective surface that has a relatively sharp radius. The term "sharp radius" defines a convex surface with a relatively small radius such that the convex surface forms an arc that adequately disperses light. While light from a concave reflective surface, as is common with the sinks discussed herein, will tend to concentrate along a particular axis, light reflected from a convex reflective surface will tend to dissipate in different directions. The convex surface can be a convex rib with a sharp radius or a half-sphere with a sharp radius. The sharp radii of these two embodiments allow these two glare prevention features to spread out the light that strikes its surface over a large area in order to prevent glare from being emitted from the lamp assembly. In another embodiment of the subject invention, the glare prevention feature comprises a rib with a substantially perpendicular surface and an angled or curved surface. This embodiment prevents glare by redirecting most of the light that strikes its surfaces so that it is not emitted out of the front lamp assembly.

DETAILED DESCRIPTION OF THE INVENTION

Figure 1:
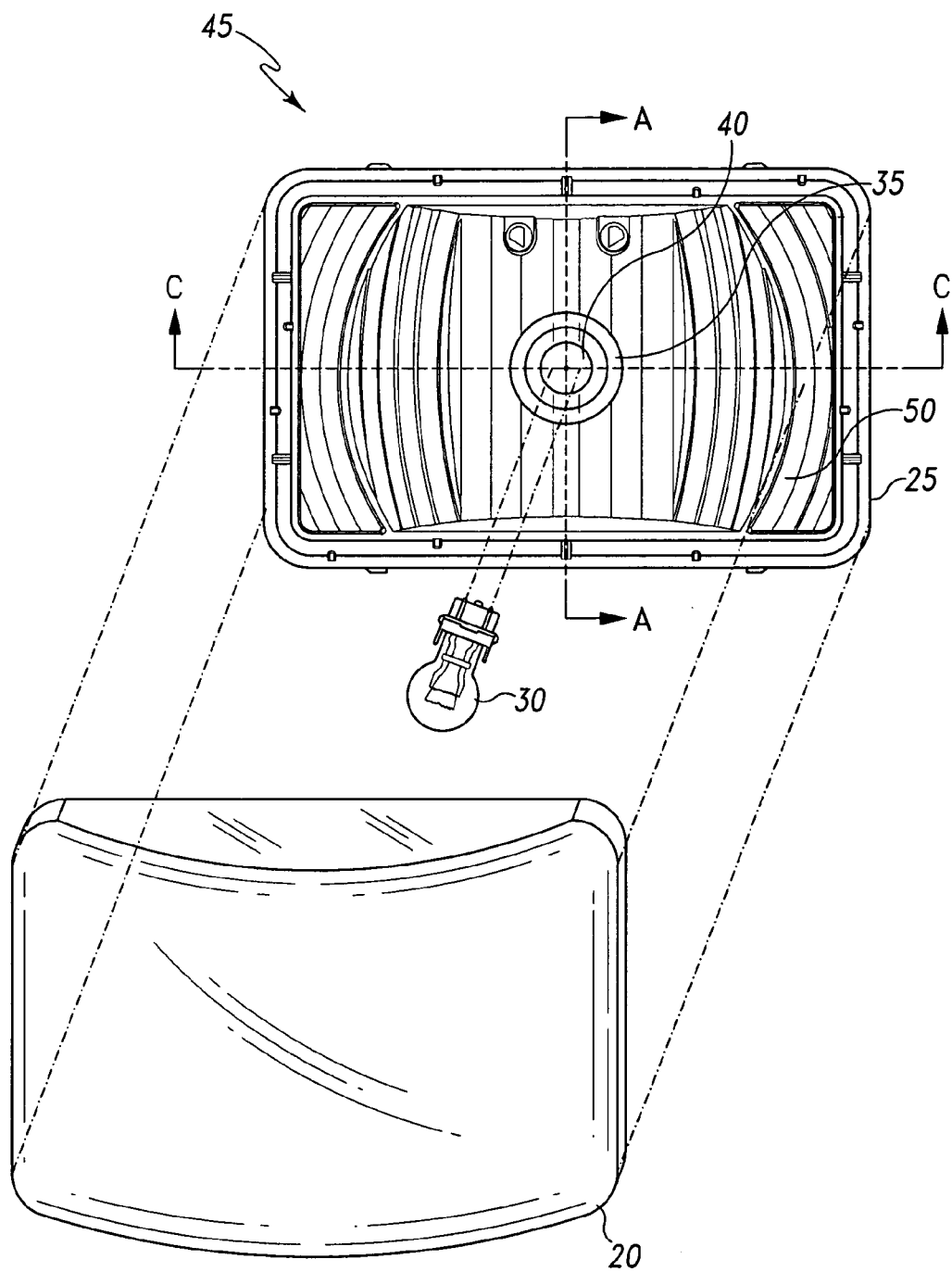
FIG. 1 is an exploded front view of an exemplary headlamp assembly of the subject invention.

FIG. 1 shows an exploded view of an exemplary embodiment of an automotive lamp assembly that utilizes a glare prevention feature. As shown in FIG. 1, the exemplary embodiment comprises automotive front lamp assembly 45. Front lamp assembly 45 comprises a lens 20 connected to a lamp housing 25 by means well known in the art. For example, an adhesive/sealant can be placed on either lamp housing 25 or lens 20 in order to join them together. Lamp housing 25 contains a reflector 50. In this embodiment, reflector 50 comprises a thermoplastic reflector having a socket hole 40 that accepts and holds a light source 30. Reflector 50 is mounted within lamp housing 25 by means well known in the art. For example, an adhesive can be used to mount the reflector to the lamp housing or the reflector can be snapped into the lamp housing. A glare prevention feature 35 is located on reflector 50. As described in more detail below, glare prevention feature 35 is a thickened portion of the reflector that is formed on the reflector to prevent, at least in part, the formation of a sink and/or to fill or partially fill a recessed area on the reflector where a sink exists. While reflector 50 is a thermoplastic reflector in this embodiment, it will be appreciated by one skilled in the art that the reflector can comprise any number of reflectors known in the art.

Figure 2:
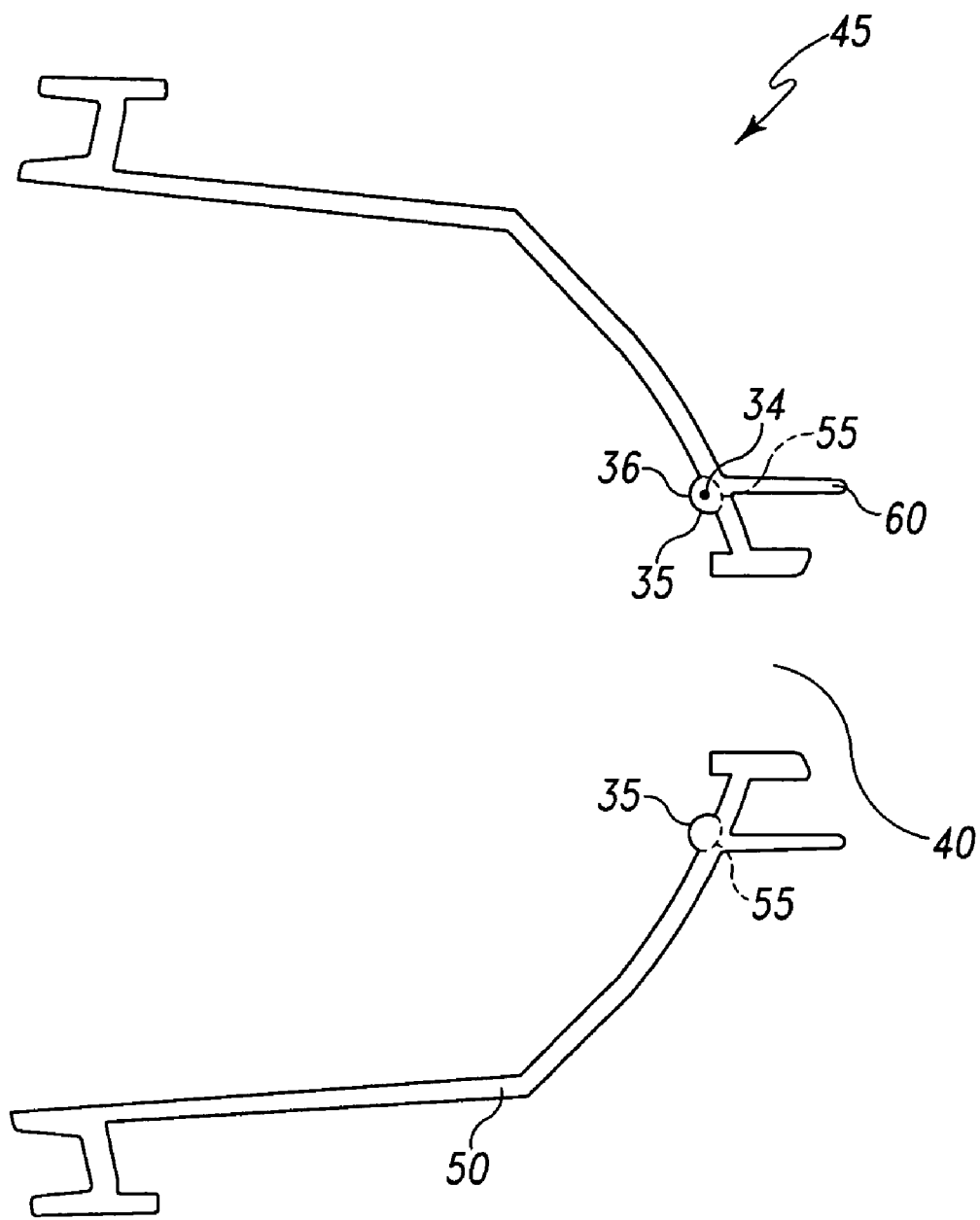
FIG. 2 is a cross-sectional view of the reflector of the exemplary headlamp assembly of FIG. 1 along line A—A.

FIG. 2 is a cross-sectional view of front lamp assembly 45 along line A—A of FIG. 1. As shown in FIG. 2, reflector 50 has a thick section 60 around socket hole 40 and glare prevention feature 35 located in front of the thick section. If glare prevention feature was not present, a sink 55 would form in front of thick section 60. Glare prevention feature 35 is molded in the place where sink 55 would form (shown by dotted line in FIG. 2) in order to prevent the formation of the sink and the associated glare problems therewith. Glare prevention feature 35 is a rib 34 with a convex surface 36 that has a sharp radius. The sharp radius of glare prevention feature 35 causes light to spread out over a very large area and reduces the intensity of any light that strikes and reflects off of its surface. This sharp radius prevents glare by preventing light from hitting the convex surface of sink 55 and being reflected off of sink 55 over a small angle. Thus, a designer of front lamp assemblies can prevent the glare caused by sink 55 by molding glare prevention feature 35 in the place where the sink would form.

Figure 3:
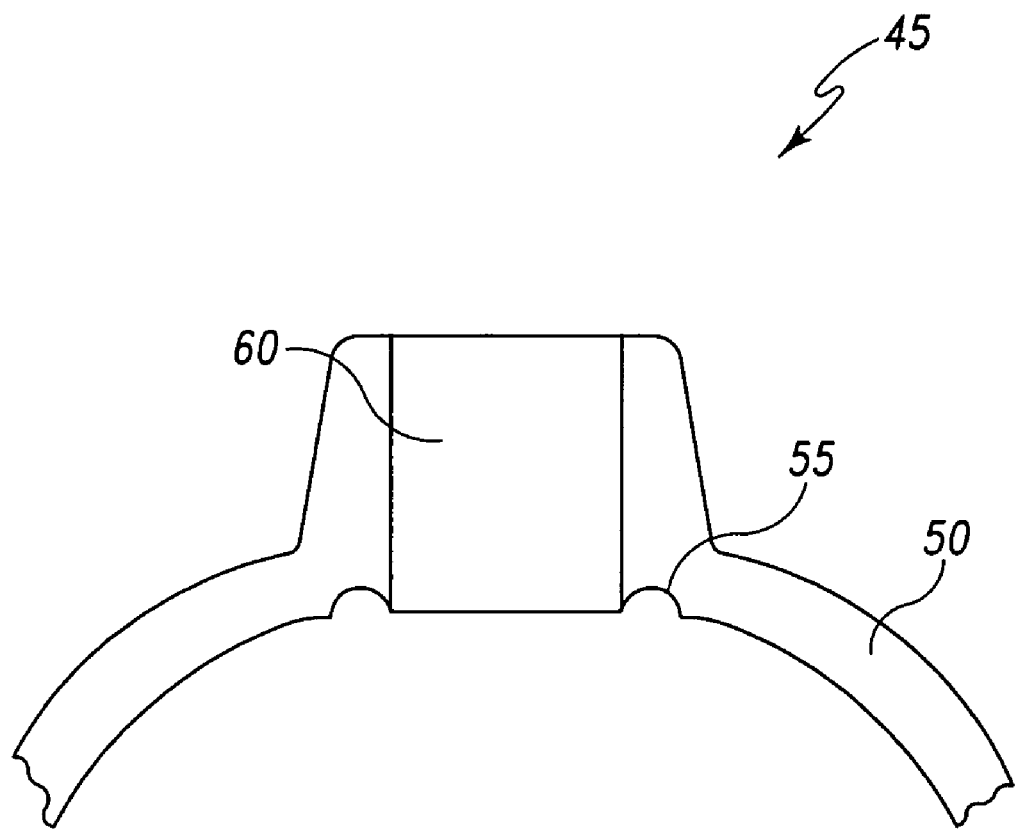
FIG. 3 is a cross-sectional view of the reflector of the exemplary headlamp assembly of FIG. 1 along line C—C without the glare prevention feature.

Glare prevention feature 35 forms and becomes part of reflector 50 during the manufacture of the reflector. Reflector 50 is manufactured by an injection molding process well known in the art. A designer can determine where sink 55 is located by molding a first reflector with an injection molding tool. The first reflector will not have glare prevention feature 35. FIG. 3 shows a cross-sectional view of front lamp assembly 45 along line C—C of FIG. 1 without glare prevention feature 35 included in the lamp assembly. As shown in FIG. 3, sink 55 is located in front of thick section 60 of reflector 50. Instead of molding a first reflector, a designer could predict where the sink would be located by analyzing the design (i.e. a part drawing) of the reflector. The sink will be located in front of the thick section. Once the location and size of sink 55 is determined, a designer can create glare prevention feature 35 by cutting into the injection molding tool the desired shape and size of the glare prevention feature at the location where sink 55 appears. The designer can then injection mold a reflector with the altered injection molding tool and glare prevention feature 35 will be molded in the place where sink 55 would have formed.

Figure 4:
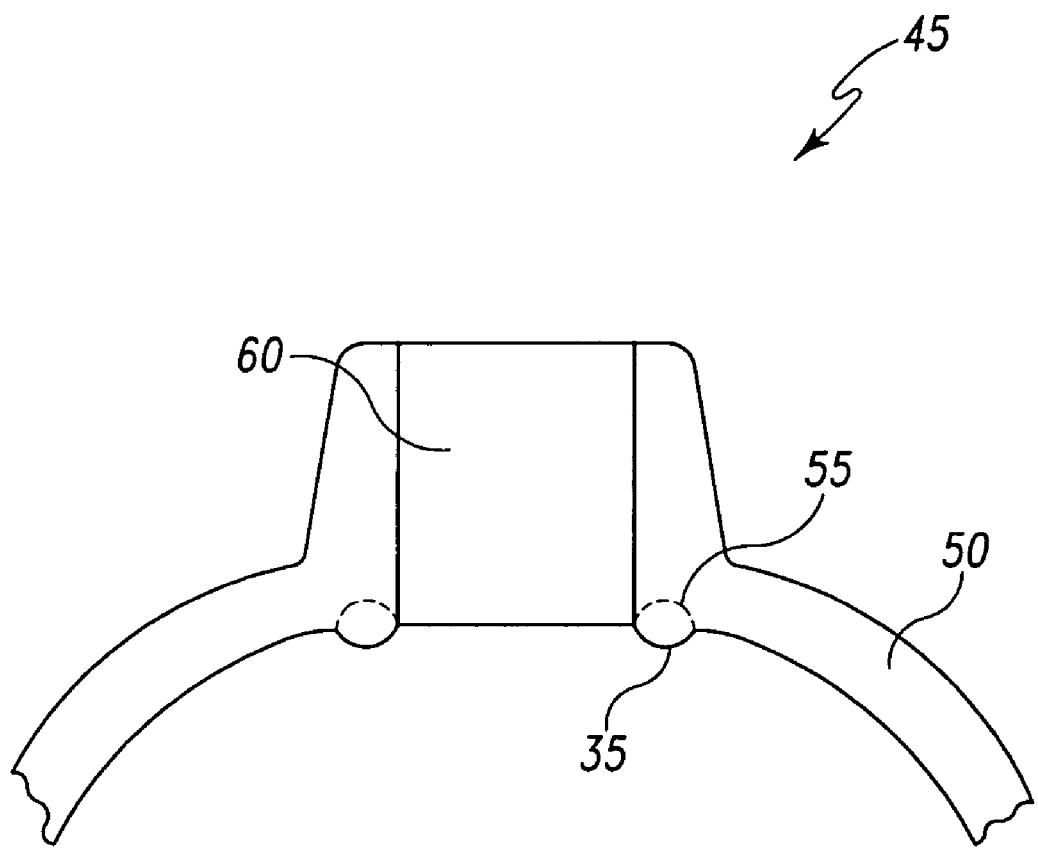
FIG. 4 is a cross-sectional view of the reflector of the exemplary headlamp assembly of FIG. 1 along line C—C with the glare prevention feature.

FIG. 4 shows a cross-sectional view of front lamp assembly with glare prevention feature 35 along line C—C of FIG. 1. As shown in FIG. 4, glare prevention feature 35 is molded in the place where sink 55 (shown by the dotted line) would form on reflector 50. In this manner, a designer can prevent sink 55 from forming by molding glare prevention feature 35 in the same location. Glare prevention feature 35 will prevent glare from being emitted from the front lamp assembly. It will be appreciated by one skilled in the art that other methods of creating the glare prevention feature can be utilized to manufacture the subject invention. For example, the designer could physically cover any sink formed on the reflector with the glare prevention feature instead of causing the glare prevention feature to be molded where the sink would normally form. Further, while the glare prevention feature comprises the same material used to create the reflector in this embodiment, it will be appreciated by one skilled in the art that various other materials can be used to manufacture the glare prevention feature.

Figure 5:
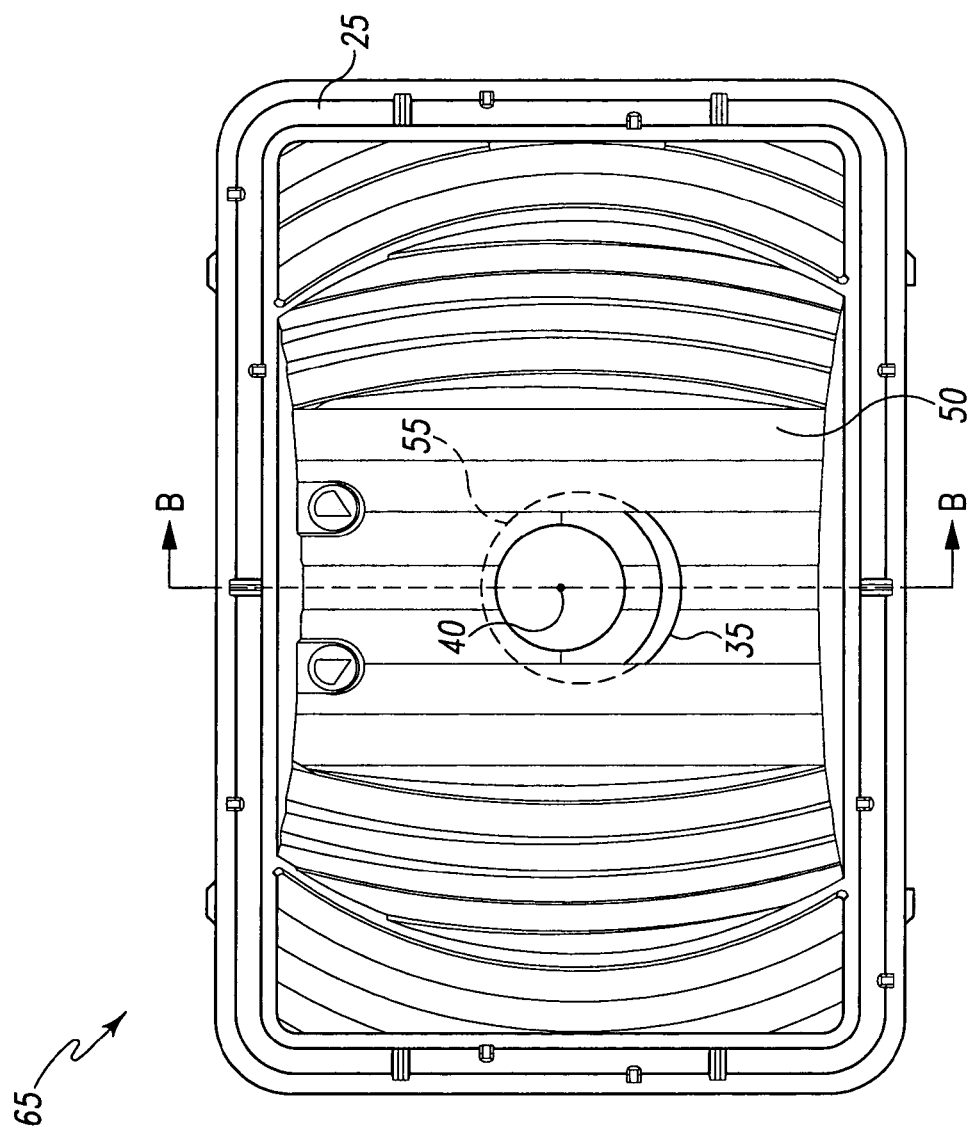
FIG. 5 is a front view of a reflector of an exemplary fog lamp assembly of the subject invention without a lens and without a light source.
Figure 6:
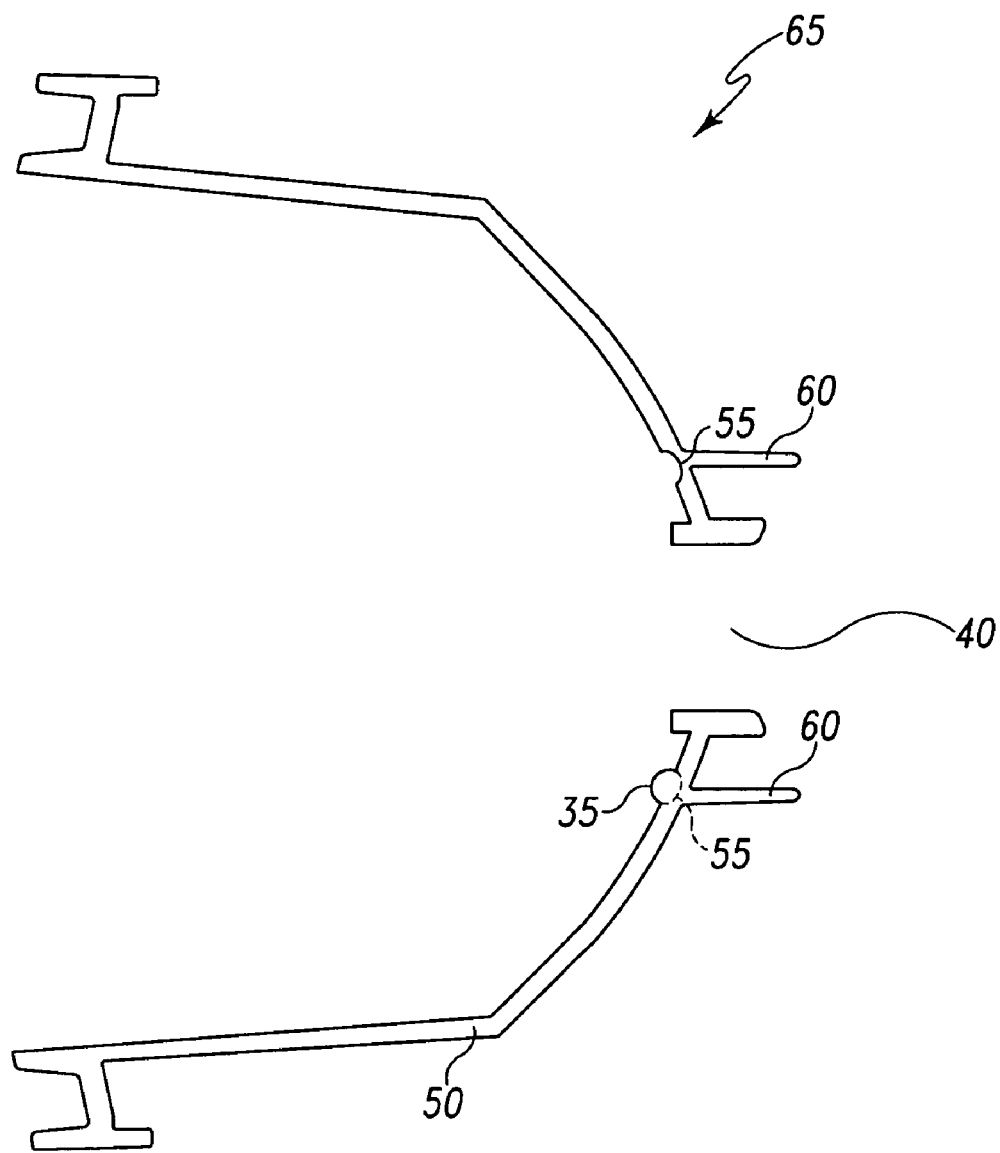
FIG. 6 is a cross-sectional view of the reflector of FIG. 5 along line B—B.

Glare prevention feature 35 does not have to be molded in a way that prevents the entire sink 55 from forming. While preventing all of the formation of sink 55 is necessary to prevent all glare produced by the sink, it may be desirable for a designer to reduce the glare instead of entirely eliminating it. FIG. 5 shows a front view of another exemplary embodiment of the subject invention without its light source and its lens. As shown in FIG. 5, the exemplary embodiment comprises fog lamp assembly 65 with reflector 50 and lamp housing 25. Reflector 50 has socket hole 40 located in the center of the reflector and glare prevention feature 35 located on the reflector. FIG. 6 shows a cross-sectional view of fog lamp assembly 65 along line B—B of FIG. 5. As shown in FIGS. 5 and 6, glare prevention feature 35 only prevents the formation of a portion of sink 55. By partially preventing the formation of sink 55, the glare can be reduced to meet the desired lighting requirements for the particular automotive front lamp assembly being created.

Figure 7:
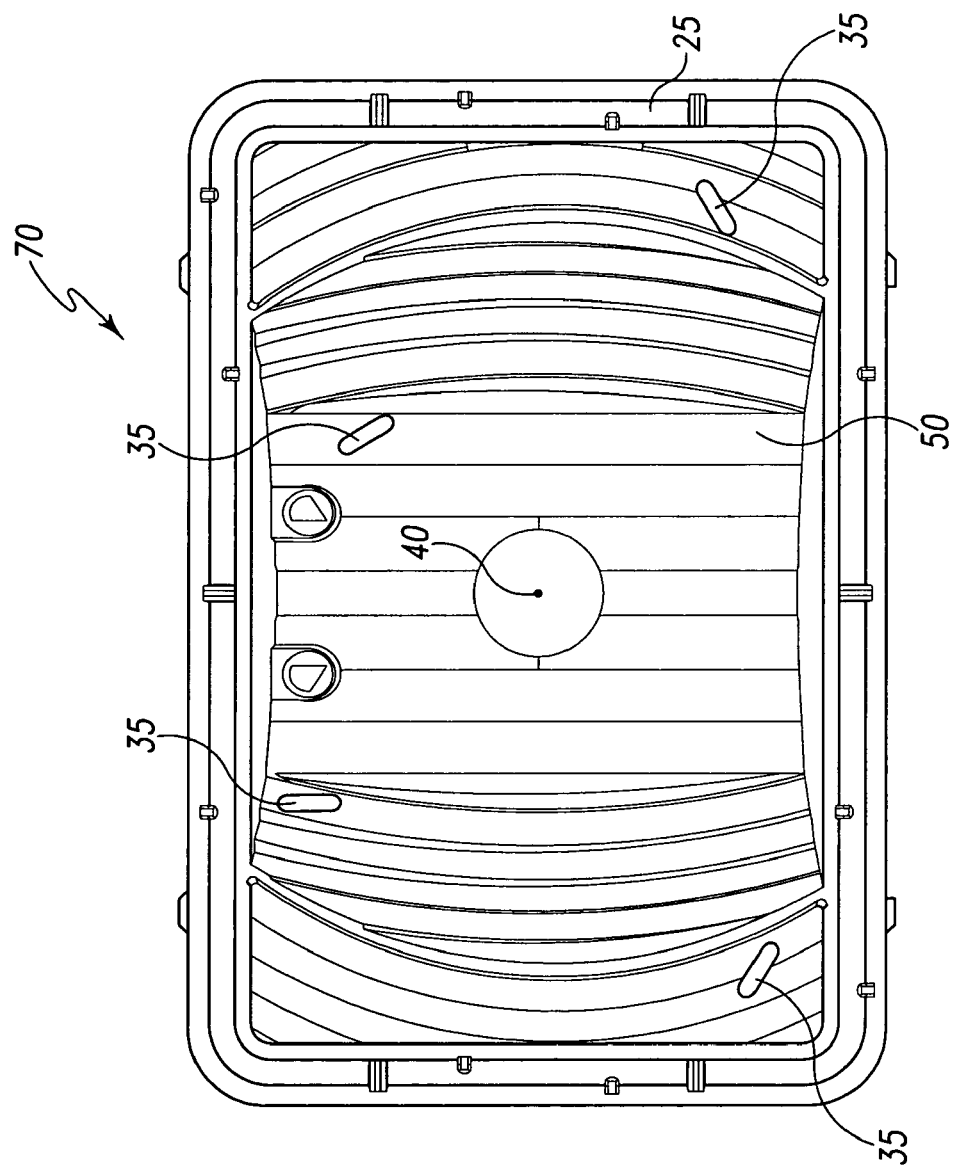
FIG. 7 is a front view of another exemplary embodiment of the subject invention without a lens and a light source.

Glare prevention feature 35 can be located anywhere on reflector 50 and can be any shape and size necessary to prevent the formation of any number of sinks 55. FIG. 7 shows a front view of automotive front lamp assembly 70 without its lens and its light source. As shown in FIG. 7, automotive front lamp assembly 70 comprises reflector 50 and lamp housing 25. Reflector 50 has socket hole 40 in the center of the reflector and plurality of glare prevention features 35 located on the reflector. Each of the plurality of glare prevention features 35 can be small in size and located anywhere on reflector 50 in order to prevent the formation of any sink 55 on the reflector. It will be appreciated by one skilled in the art that the glare prevention feature can comprise many different shapes and designs in order to prevent the formation of the sink or sinks on the reflector.

Figure 8:
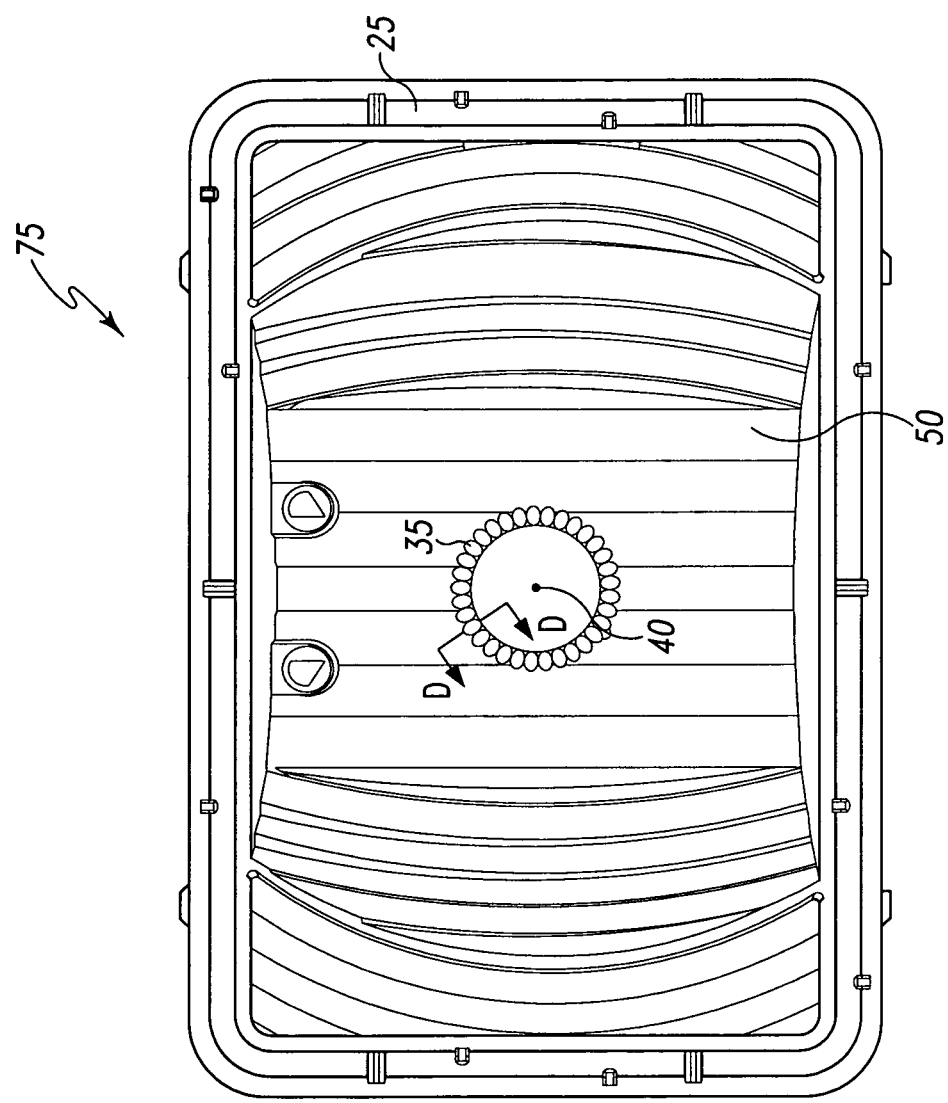
FIG. 8 is a front view of another exemplary embodiment of the subject invention without a lens and a light source.
Figure 9:
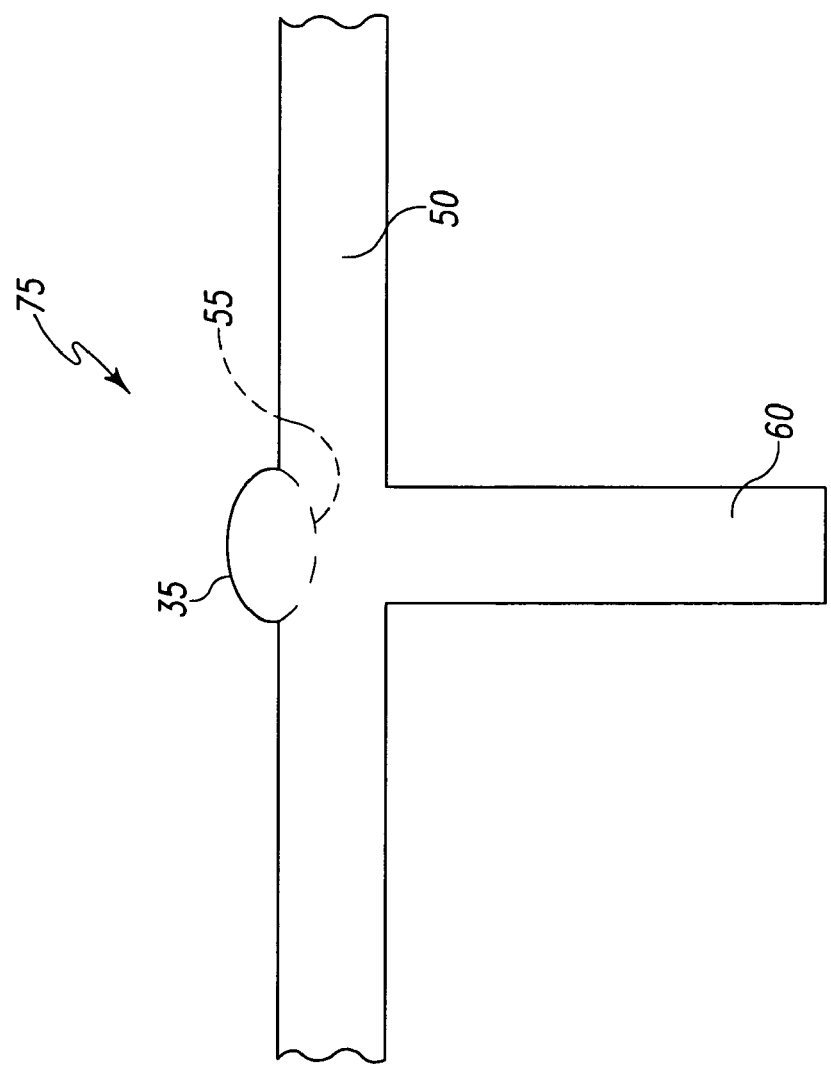
FIG. 9 is a cross-sectional view of the glare prevention feature along line D—D of FIG. 8.

FIG. 8 shows another exemplary embodiment of the subject invention without its lens and its light source. As shown in FIG. 8, this exemplary embodiment comprises front lamp assembly 75 having reflector 50 and lamp housing 25. Reflector 50 has socket hole 40 located in the center of the reflector and plurality of glare prevention features 35 located on its surface. In this embodiment, each of the plurality of glare prevention features 35 comprises a half-sphere with a sharp radius. Plurality of glare prevention features 35 prevent the formation of sink 55 by being molded on reflector 50 where the sink would form. FIG. 9 shows a cross sectional view along line D—D of FIG. 8 of one of the plurality of glare prevention features 35 on reflector 50. As shown in FIG. 9, each individual glare prevention feature 35 forms a convex surface where sink 55 (shown by dotted line) would have been located. As already described, this prevents glare by spreading any light that strikes the convex surface over a large area.

Figure 10:
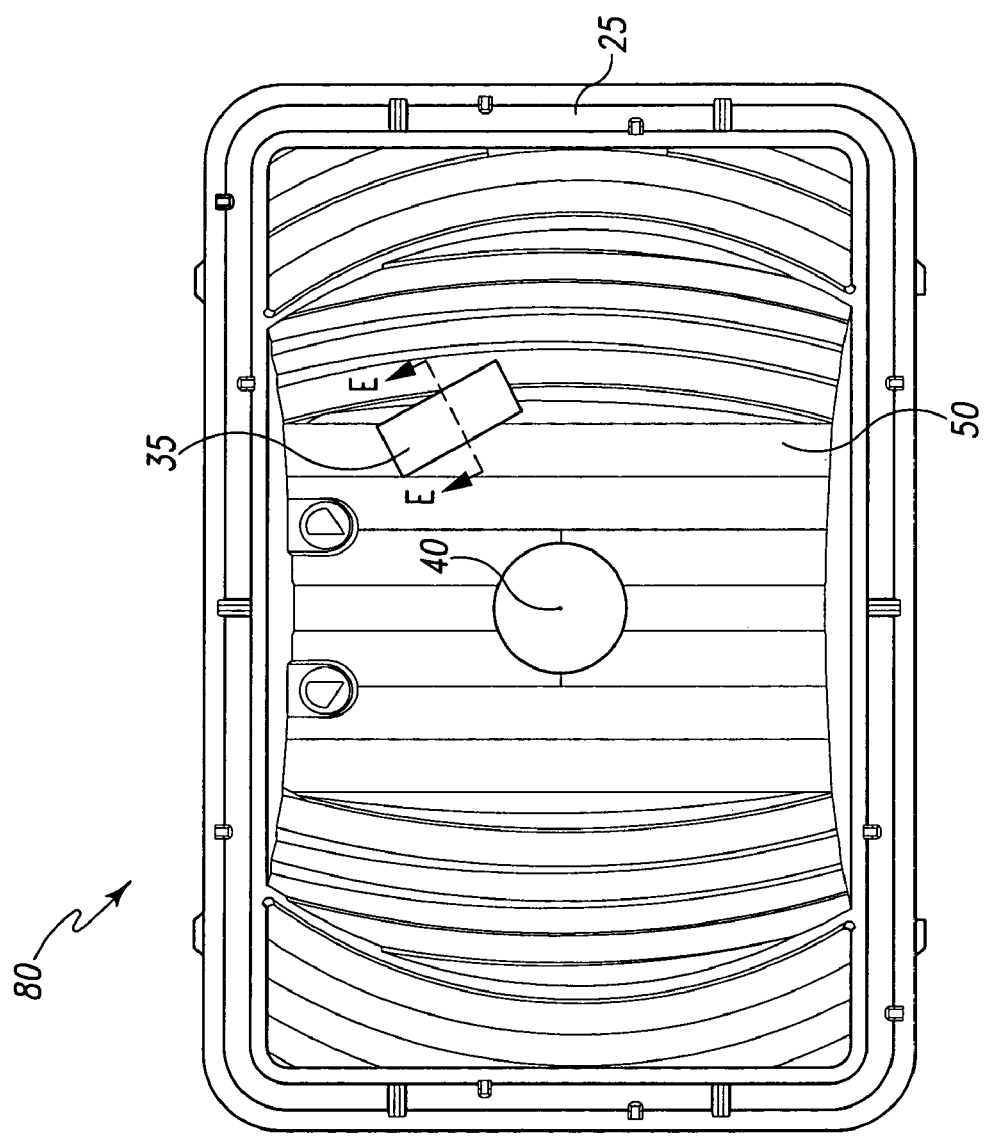
FIG. 10 is a front view of another exemplary embodiment of the subject invention without a lens and a light source.
Figure 11:
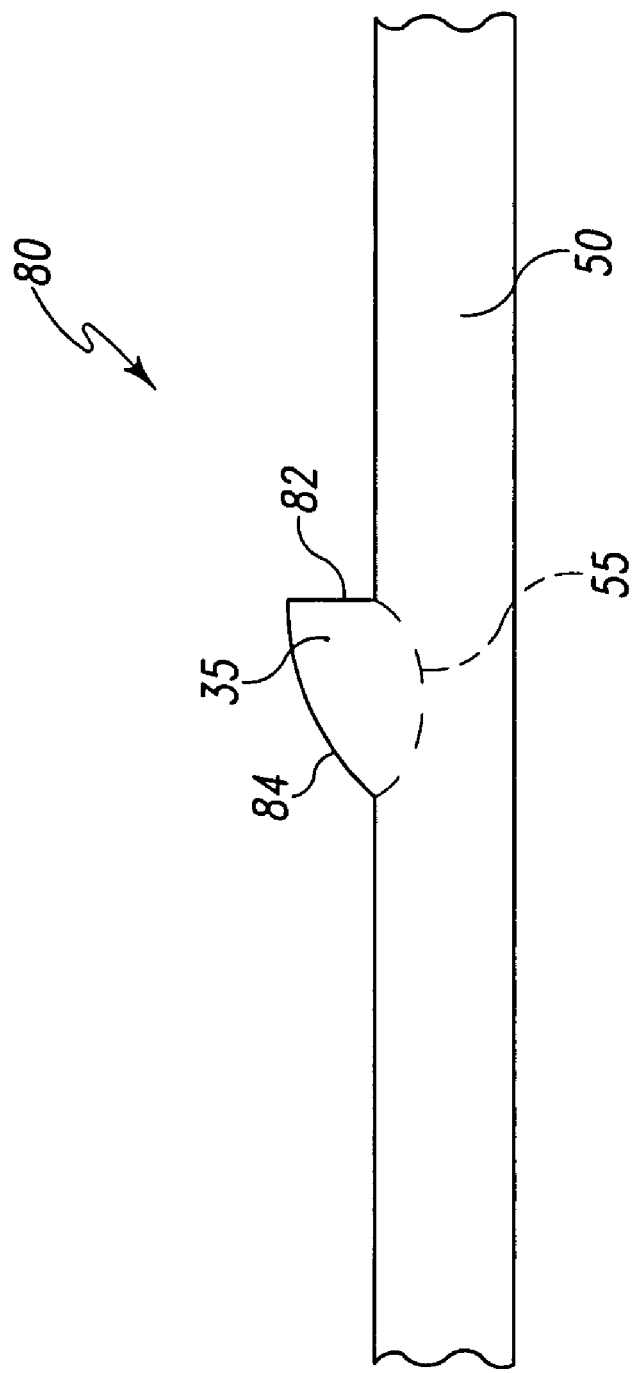
FIG. 11 is a cross-sectional view of the glare prevention feature along line E—E of FIG. 10.

Glare prevention feature 35 can also comprise a rib that redirects the light into a non-reflective surface such as the sidewall or the floor of lamp housing 25. FIG. 10 shows another exemplary embodiment of the subject invention without its lens and its light source. The exemplary embodiment comprises front lamp assembly 80 having lamp housing 25 and reflector 50. Reflector 50 has socket hole 40 located in the center of the reflector and glare prevention feature 35 located on its surface. FIG. 11 shows a cross sectional view along line E—E of FIG. 10 of glare prevention feature 35. As shown in FIG. 11, glare prevention feature 35 of this embodiment comprises a rib with a substantially perpendicular surface 82 and a curved surface 84. Substantially perpendicular surface 82 is substantially perpendicular to reflector 50. In this embodiment, glare prevention feature 35 is located where sink 55 (shown by dotted line) would have formed. As a result, most of the light that hits the glare prevention feature's surface will be redirected into a non-reflective surface, such as the side-wall or floor of lamp housing 25. Thus, glare prevention feature 35 prevents glare by redirecting the light in a manner that does not allow it to pass out of lens 20 (not pictured). While glare prevention feature comprises curved surface 84, it will be appreciated by one skilled in the art that the surface can be angled in such a way to cause the light to be redirected in the desired manner. It will also be appreciated that glare prevention feature 35 could also redirect the light into a reflective surface that either spreads the light out so that it does not cause glare or into a reflective surface that will cause the light to continuously be reflected until it dissipates.

While the subject invention has been described in considerable detail with references to particular embodiments thereof, such is offered by way of non-limiting examples of the invention as many other versions are possible. For example, one could cover a sink located on a reflector with a glare prevention feature instead of molding the glare prevention feature where the sink would normally be. The sink could be filled with an epoxy to form a convex surface over the sink and then the epoxy surface could be covered with a reflective coating so that light that hits the glare prevention feature will be reflected over a large angle. It is anticipated that a variety of other modifications and changes will be apparent to those having ordinary skill in the art and that such modifications and changes are intended to be encompassed within the spirit and scope of the pending claims.

I claim:

1. A method of molding an automotive front lamp assembly reflector comprising the steps of:
   a. providing an injection molding tool;
   b. determining where at least one sink will form on a reflector;
   c. cutting an area into the injection molding tool that corresponds to the location of the at least one sink on the first reflector in order to create at least one glare prevention feature; and
   d. molding with the injection molding tool, that has the area cut into it, the reflector, so that the at least one glare prevention feature forms on the reflector in approximately the same location as the at least one sink would have formed.

2. The method of molding an automotive front lamp assembly reflector of claim 1 wherein the reflector comprises a thermoplastic reflector.

3. The method of molding an automotive front lamp assembly reflector of claim 1, wherein the at least one glare prevention feature comprises a rib with a convex surface having a sharp radius.

4. The method of molding an automotive front lamp assembly reflector of claim 1, wherein the at least one glare prevention feature comprises a half-sphere having a sharp radius.

5. The method of molding an automotive front lamp assembly reflector of claim 1, wherein the at least one glare prevention feature comprises a rib with a substantially perpendicular surface to the reflector and a curved surface.

6. The method of molding an automotive front lamp assembly reflector of claim 1, wherein the at least one glare prevention feature comprises a rib with a substantially perpendicular surface to the reflector and an angled surface.

* * * * *